United States Patent [19]

Reubeuze

[11] Patent Number: 5,052,989
[45] Date of Patent: Oct. 1, 1991

[54] DEVICE FOR COMPENSATING CLEARANCES BETWEEN THE SATELLITE AND TOOTHINGS OF THE FLANGES OF A REDUCING MECHANISM FOR ADJUSTMENT IN POSITION OF SEATS, PARTICULARLY OF AUTOMOBILE SEATS

[75] Inventor: Yann Reubeuze, Orne, France
[73] Assignee: Ets. Cousin Freres, Orne, France
[21] Appl. No.: 556,009
[22] Filed: Jul. 20, 1990

[30] Foreign Application Priority Data

Jul. 24, 1989 [FR] France .................. 89 09930

[51] Int. Cl.$^5$ .................. F16H 35/00; B60N 2/02
[52] U.S. Cl. .................. 475/170; 297/362
[58] Field of Search .................. 475/170, 176, 177; 297/362

[56] References Cited

U.S. PATENT DOCUMENTS

| | | | |
|---|---|---|---|
| 4,453,767 | 6/1984 | Walk et al. | 475/177 X |
| 4,634,181 | 1/1987 | Pipon | 475/177 X |
| 4,708,392 | 11/1987 | Werner et al. | 297/362 |

Primary Examiner—Allan D. Herrmann
Assistant Examiner—David W. Laub
Attorney, Agent, or Firm—Robert W. Becker & Associates

[57] ABSTRACT

A device for compensating for clearances between a satellite and toothings of flanges of a reducing mechanism provided for adjusting the position of a seat. The mechanism has a fixed flange and a mobile flange that are held against one another via a crimped ring and enclose an eccentrically mounted satellite that bears on a cam driven by a shaft. This shaft has a square section with a first conical portion, and with a cone that is disposed in a central opening of the fixed flange. A spring is disposed between the cone and a peg provided on the shaft. When a hard point is met upon cooperation of toothings of the fixed and mobile flanges with a double toothing of the satellite, a slight longitudinal offset movement of the shaft in either direction is produced, resulting via one of the first conical portion and the cone in a change in eccentration of the satellite, thereby providing for passage of the hard point. As soon as the hard point is passed, the spring, which was stressed during the movement of the shaft, returns the various components to a starting position, thereby reestablishing an original eccentricity.

2 Claims, 1 Drawing Sheet

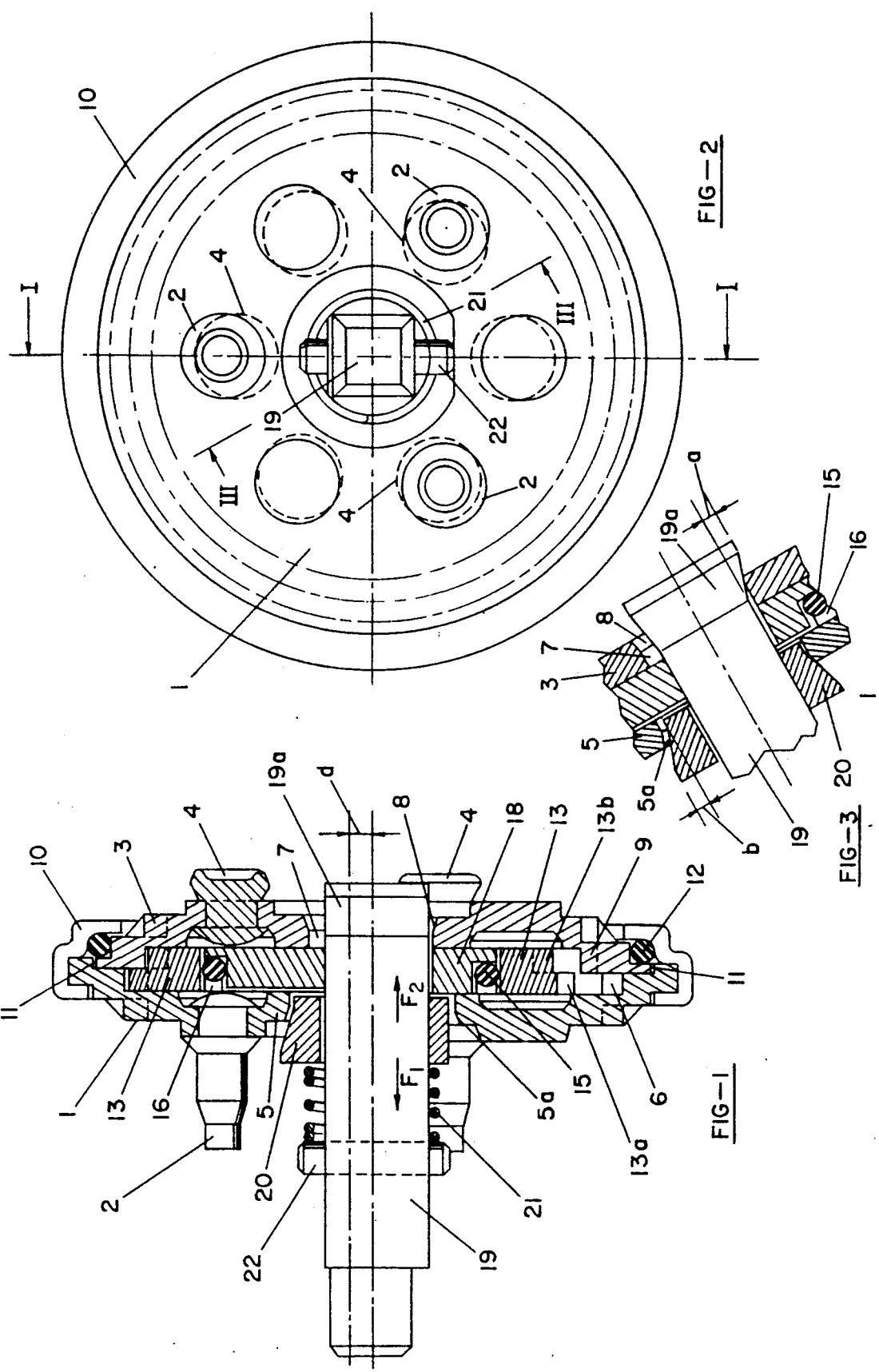

DEVICE FOR COMPENSATING CLEARANCES BETWEEN THE SATELLITE AND TOOTHINGS OF THE FLANGES OF A REDUCING MECHANISM FOR ADJUSTMENT IN POSITION OF SEATS, PARTICULARLY OF AUTOMOBILE SEATS

FIELD OF THE INVENTION

The object of the present invention is a device for compensating the clearances inherent to the manufacture and wear which are produced between the satellite and the toothings of flanges of the reducing mechanisms used as articulations for adjustment in position of seats, particularly of automobile seats.

BACKGROUND OF THE INVENTION

In seats of land and air vehicles, mechanisms called "articulations" are increasingly used. These mechanisms include a reducing element for positioning either seat back or the seating portion. In the case of the seat back these mechanisms being each made of a fixed flange rigidly connected to the seating portion armature while a mobile flange is rigidly connected to the lower portion of the back armature of this seat.

These flanges comprise inside circular toothings with a different number of teeth. The circular toothings are relatively driven by means of a double satellite rolling on the aforementioned toothings by means of a cam having a periphery which is provided with a roller bearing placed in a recessed central portion of the satellite. This cam is in turn driven by a driving shaft controlled either manually or by means of a motor so that the inclination of the seat back with respect to the seating portion can be adjusted according to the wish of the passenger.

In the case where such reducing mechanisms, called "round articulations", are placed underneath the seat in order to adjust the position of the seating portion, the fixed part is rigidly connected to the base support of the seating portion; and the mobile part of the arms acts on the lower part of the armature of the seating portion in order to adjust the position of the seating portion.

Generally, the fixed and mobile flanges are attached to the members forming the fixed armature and the mobile armature either by means of bolts or by means of rivets placed at 120° with respect to one another on the outer periphery of these flanges so that mounting of these round articulation mechanisms on the seats will be rapid and without problem.

Due to the manufacturing tolerances (in particular to the unavoidable ovalization of the various toothings which are formed most often by a fine cutting operation), and also due to the wear of these toothings, clearances will appear which impart a slight wobble either to the seating portion or to the seat back. Attempts have been made, by different means, to obviate these clearances but, till now, these mechanisms are ineffective and costly, and require a mounting operation which is sometimes difficult to carry out on an automatic machine.

This is the reason why a study has been made to provide, by opposite cones, a take up of the eccentricity of the toothings of the flanges and toothings of the satellite where there is a hard point caused by a combination of the abovementioned clearances.

There is thus obtained by a simple mechanism, a reduction of the eccentricity which occurs when a hard point is passed and therefore the clearances are taken up, thus avoiding the hereabove mentioned disadvantages.

SUMMARY OF THE INVENTION

According to the invention, the driving shaft has a square section with one end provided with a conical portion and supports at an other end a cone housed in a central opening of the fixed flange, which cone is pushed back by a spring bearing against a peg extending through the driving shaft so that when a hard point is met by cooperation of the toothings of i) the fixed flange ii) the mobile flange iii) the satellite, a slight longitudinal offset of the driving shaft occurs in either direction, thereby causing, via one of the conical portion and cone, a change in eccentricity of the satellite which provides for passage of a hard point, then, as soon as this hard point has been passed, the spring which has been stressed by movement of the shaft returns the various parts to their prior positions, thereby re-establishing the original eccentricity.

Various other features of the invention will become apparent from the following detailed description.

BRIEF DISCLOSURE OF THE DRAWINGS

An embodiment of the invention is shown, by way of a non limiting example, in the accompanying drawings, wherein:

FIG. 1 is a diametrical cross-sectional view, taken along line I—I of FIG. 2, of a round articulation including the device of the invention for taking up the clearances between the satellite and toothings of the flanges of the round articulation;

FIG. 2 is a front view, taken on the side of the mobile flange, of the round articulation of FIG. 1;

FIG. 3 is an enlarged partial view taken along line III—III of FIG. 2.

DESCRIPTION OF A PREFERRED EMBODIMENT

Referring now to the drawings, FIG. 1 shows the fixed flange 1 of a round articulation, and which is held by bolts 2 spaced 120° apart from one another and distributed on an armature of a given seat mobile flange 3 of the round articulation is fixed by rivets 4, also spaced 120° apart with respect to one another, on the lower portion of the seat back armature.

The fixed flange 1 has in its center a circular opening 5, the front portion 5a of which is conical.

The fixed flange 1 has an inner toothing 6.

The mobile flange 3 has in its center an opening 7, the front portion 8 of which is also conical.

The mobile flange 3 has an inner toothing 9.

A crimped ring 10 holds the mobile flange 3 onto the fixed flange 1 with interposition of a roller bearing 12, and the mobile flange 3 is centered on the fixed flange 1 via a circular recess 11.

A satellite 13 has a double toothing 13a, 13b. The toothing 13a cooperates with the inner toothing 6 of the fixed flange 1 and the toothing 13b cooperates with the inner toothing 9 of the mobile flange 3.

The satellite 13 is recessed in its center for receiving a roller bearing 15 retained by a housing 16 on the outer rim of a cam 18 fixed to a shaft 19. The shaft forms the control shaft 19 for rotation of the cam 18, since the shaft 19 is, as shown in FIG. 2, of a square cross section.

Moreover, it should be noted that eccentricity of the cam 18 with respect to axis of the shaft 19 is equal to d (see FIG. 1) so that; in general, the theoretical eccentricity is in the ratio of 2.50.

End 19a of the shaft 19, on the right-hand side, is machined so as to have a conical outer shape, with an angle a at most of 15°. On the inner side, the shaft 19 carries a member 20 of an outer conical shape, the angle b of which (see FIG. 3) is also at most of 15°.

This conical member 20 is normally pushed back inside the fixed flange 1 by a spring 21 concentrical to the shaft 19 and held in position by a peg 22 extending through the shaft 19.

Rotating the shaft 19 in either direction, this drives the cam 18, which causes the toothings 13a, 13b of the satellite 13 to roll to their very bottom inside the toothings 6 and 9 of the fixed 1 and mobile 3 flanges so that the latter rotates on itself over a certain angle. However, eccentricities arising from the manufacturing tolerances cause clearance and the cam 18 is itself eccentric. Therefore, appears at certain positions what is called a "hard point", meaning that the rotation of the mobile flange 3 is almost blocked. Then, by reaction of the cam 18 on the shaft 19, the shaft 19 will slide for example, slide in the direction of arrow F1 (see FIG. 1) thus causing an offset of the shaft 19 and a penetration of the conical end portion 19a of the shaft 19 inside the central recess of the cam 18 which itself is moved to a slightly eccentric position. The result is a reduction of the excentration provided at the origin, and a passage of the hard point.

If the cam reacts on the shaft 19 in the direction of arrow F2 (see FIG. 1), it is the conical member 20 which plays the same role as is played above by the conical end portion 19a. The result is the same.

As soon as the passage of the hard point is over, the spring 21 will bring either the shaft 19 or the conical member 20 back to the first position shown in FIG. 1, and the eccentricity of the cam 18 will become normal again.

This movement is made easy since the conical parts 19a and 20 form only an angle of 15° providing for a perfect sliding movement under a small vertical load.

Since this translation movement is very small, it does not cause any difficulty even if the shaft 19 is controlled in rotation by a motor.

The device of the invention for compensation the clearances between the satellite and toothings of flanges of reducing mechanisms is very simple and enables in all cases a quick and accurate mounting on automatic machines and also reduces the cost price of the mechanisms.

Moreover, this construction is very strong and provides a great safety for the seats thus equipped.

I claim:

1. In a device for compensating for clearances between a satellite and toothings of flanges of a reducing mechanism that is provided for adjusting the position of a seat, with said mechanism comprising a fixed flange that is provided with a first inner toothing, and a mobile flange that is provided with a second inner toothing, with said fixed and mobile flanges being held against one another via a crimped ring and enclosing an eccentrically mounted satellite that is provided with a double toothing, with said satellite supported via a roller bearing on a cam that is driven by a driving shaft, the improvement wherein:

said driving shaft has a square section with a first conical portion, and with a cone that is disposed in a central opening of said fixed flange, with a spring being disposed between said cone and bearing means provided on said shaft, whereby when a hard point is met upon cooperation of said first and second toothings of said fixed and mobile flanges with said double toothing of said satellite, a slight longitudinal offset movement of said driving shaft in either direction and stressing of said spring is produced, resulting via one of said first conical portion and said cone in a change in eccentricity of said satellite thereby providing for passage of said hard point, whereby as soon as said hard point is passed, said spring, due to said stressing thereof, returns the various components to a starting position, thereby reestablishing an original eccentricity.

2. A device according to claim 1, in which said first conical portion and said cone each have an angle of at most 15°.

* * * * *